United States Patent
Arnalsteen et al.

(10) Patent No.: US 7,913,671 B2
(45) Date of Patent: Mar. 29, 2011

(54) DEVICE FOR THE VENTING CIRCUIT OF A LIQUID TANK AND VALVE INCORPORATING SAID DEVICE

(75) Inventors: Michel Arnalsteen, Groot-Bijgaarden (BE); Vincent Cuvelier, Brussels (BE); Patrice Baudoux, Flavy le Martel (FR)

(73) Assignee: Inergy Automotive Systems Research (S.A.), Brussels (BE)

( * ) Notice: Subject to any disclaimer, the term of this patent is extended or adjusted under 35 U.S.C. 154(b) by 265 days.

(21) Appl. No.: 12/161,348

(22) PCT Filed: Jan. 23, 2007

(86) PCT No.: PCT/EP2007/050623
§ 371 (c)(1),
(2), (4) Date: Sep. 8, 2008

(87) PCT Pub. No.: WO2007/085585
PCT Pub. Date: Aug. 2, 2007

(65) Prior Publication Data
US 2010/0218748 A1    Sep. 2, 2010

(30) Foreign Application Priority Data
Jan. 26, 2006    (FR) .................................... 06 00801

(51) Int. Cl.
*F02M 37/20* (2006.01)
*F16K 24/00* (2006.01)
(52) U.S. Cl. ........................................ 123/516; 137/202
(58) Field of Classification Search .................. 123/516; 137/43, 202, 171, 192
See application file for complete search history.

(56) References Cited

U.S. PATENT DOCUMENTS

| 1,628,069 A | | 10/1927 | Schmidt et al. | |
| 5,156,178 A | * | 10/1992 | Harris | 137/43 |
| 5,449,018 A | * | 9/1995 | Harris | 137/493.9 |

(Continued)

FOREIGN PATENT DOCUMENTS

EP    1112886 B1    4/2001

(Continued)

OTHER PUBLICATIONS

PCT Search Report dated Jun. 20, 2007 for International Application No. PCT/EP2007/050623 (2 p.).

(Continued)

*Primary Examiner* — John T Kwon
*Assistant Examiner* — Arnold Castro
(74) *Attorney, Agent, or Firm* — Beatrice C. Ortego

(57) ABSTRACT

A device for a venting circuit of a liquid tank provided with a canister and a filling tube including a filling head, this device comprising:
a) a control chamber that communicates with:
  the canister via a main orifice and a smaller-flow-area secondary orifice, both terminating in a ventilation line leading to the canister;
  the interior of the tank via the venting circuit; and
  the filling head via a pressure-equalizing line;
b) a closure member that is:
  provided with an opening therethrough which brings the venting circuit into communication with the pressure-equalizing line;
  able to move in the control chamber between an operating position with the main orifice closed off by gravity and the secondary orifice left open, and a filling position with both orifices left open; and
  shaped to sealingly conform to at least a control chamber part that includes the main orifice.

10 Claims, 8 Drawing Sheets

U.S. PATENT DOCUMENTS

| | | | |
|---|---|---|---|
| 5,449,029 A | | 9/1995 | Harris |
| 5,579,802 A | * | 12/1996 | Tuckey .......................... 137/202 |
| 5,924,438 A | * | 7/1999 | Cimminelli et al. ............ 137/39 |
| 5,960,816 A | * | 10/1999 | Mills et al. .................... 137/202 |
| 6,016,827 A | | 1/2000 | Dawson |
| 6,145,532 A | * | 11/2000 | Tuckey et al. ................. 137/202 |
| 6,412,511 B1 | | 7/2002 | Rosseel |
| 6,626,156 B2 | | 9/2003 | Rosseel |
| 6,675,779 B2 | | 1/2004 | King et al. |
| 6,959,720 B2 | | 11/2005 | Kurihara et al. |
| 7,188,613 B2 | * | 3/2007 | Miura et al. ................... 123/516 |
| 7,428,914 B2 | * | 9/2008 | Kaneko et al. ............ 137/512.1 |
| 2002/0112757 A1 | | 8/2002 | DeCapua et al. |
| 2002/0124909 A1 | | 9/2002 | Groom et al. |
| 2003/0037838 A1 | * | 2/2003 | Nakajima et al. ............... 141/65 |
| 2005/0098160 A1 | * | 5/2005 | Taxon ........................... 123/516 |
| 2005/0229967 A1 | * | 10/2005 | Ueki ................................ 137/2 |
| 2009/0293849 A1 | * | 12/2009 | Kito et al. ..................... 123/520 |
| 2010/0224265 A1 | * | 9/2010 | Kobayashi et al. ........... 137/202 |

FOREIGN PATENT DOCUMENTS

| | | |
|---|---|---|
| FR | 2625284 | 6/1989 |
| JP | 2021086 | 1/1990 |
| WO | WO0053960 | 9/2000 |
| WO | WO2006125752 | 11/2006 |

OTHER PUBLICATIONS

Search Report dated Nov. 20, 2006 provided by the Institut National de la Propriete Industrielle for French Application No. FR2006/00801 (2 p.).
U.S. Appl. No. 11/915,363, filed May 18, 2006 by Arnalstee.
U.S. Appl. No. 09/745,531, filed Dec. 26, 2000 by Rosseel.
U.S. Appl. No. 09/745,556, filed Dec. 26, 2000 by Rosseel.

* cited by examiner

DEVICE FOR THE VENTING CIRCUIT OF A LIQUID TANK AND VALVE INCORPORATING SAID DEVICE

CROSS-REFERENCE TO RELATED APPLICATIONS

This application is a U.S. national stage application under 35 U.S.C. §371 of International Application No. PCT/EP2007/050623, filed Jan. 23, 2007, which claims priority to French Application No. 0600801, filed Jan. 26, 2006, each of which is hereby incorporated by reference in its entirety for all purposes.

The present invention relates to a flow management device for the venting circuit of a liquid tank, in particular a fuel tank with which a motor vehicle may be equipped. It also relates to a valve incorporating such a device.

Liquid tanks, particularly fuel tanks for motor vehicles, are nowadays generally provided, among other things, with a venting circuit. This circuit allows air to be introduced into the tank in the event of under pressure (especially for compensating for the volume of liquid consumed) or allows the gases contained in the tank to be removed in the event of overpressure (especially in the event of overheating). This circuit also allows the gases that have to be discharged into the atmosphere to be channeled and possibly filtered for the purpose of meeting the other stricter environmental requirements in this regard. This filtering generally takes place by means of an active carbon filter, also called a "canister".

Conventional venting circuits therefore comprise valves and ducts intended to convey the gases between the tank and the canister, or even also between the tank and the duct head.

The flow rate of the gases conveyed from the tank to the canister can vary: typically, it is considerably greater during filling than during normal operation of the vehicle (when being driven or at rest). The ventilation valves must therefore be able to accommodate these two types of flow rates. Furthermore, these valves are preferably designed so as to limit the risk of liquid fuel splashing the canister, especially when the vehicle is being driven, so as to prevent the canister from being fouled thereby.

The carbon filter or canister is regularly regenerated by what is called a purge. This consists in desorbing the gases adsorbed on the filter by generally using a stream of hot air, and then in taking the vapours thus generated into the engine so as to be burnt therein. The purge strategy varies from one vehicle manufacturer to another. Some of these strategies require, in operation, the most constant charging possible, avoiding sudden charging of the canister. It is therefore known to equip the ventilation valve with a flow management device or FMV (Flow Management Valve) that has the function of varying the flow area of the ventilation line according to the requirements:

in the filling situation, this device ensures that there is a wide orifice (for example 12 mm in diameter) in order to prevent the tank from rising in pressure; and in operation, this device minimizes the flow area so as to prevent the canister from being charged too abruptly.

Valves with FMVs of various types have been developed. Thus, Patent EP 1 112 886 in the name of the Applicant discloses a valve that includes a controllable moving member for modifying the configuration of the valve and a first movable closure element that includes an orifice and is capable of being moved by the moving member from a first position to a second position, the switching from the first position to the second reducing the flow area offered to the gas flow. The configuration of this valve is modified thanks to the power of a fuel pump, which is the same as that used to send the fuel to the fuel injectors of the engine. In one particular embodiment, the valve is designed so that the moving member is moved from the first position to the second position under the effect of a vacuum created by the Venturi effect via the fuel pump. Such an active system, connected to the fuel pump, is expensive, complex and runs the risk of malfunction.

U.S. Pat. No. 6,675,779 discloses a multifunction valve, one of the functions of which consists of flow management. This function is provided by means of a diaphragm pierced by an orifice and located in a chamber provided with orifices of different sizes, said diaphragm being capable both of closing off the largest of these orifices, and of freeing it, thus allowing a greater rate of ventilation. The diaphragm illustrated comprises a rigid central plate and a flexible peripheral part via the edge of which said diaphragm is inserted between two parts of the body of the valve. Such a component incurs relatively substantial manufacturing and fitting costs.

The object of the present invention is therefore to provide an FMV that is reliable, has a simple geometry, is inexpensive and is easy to incorporate into a ventilation valve.

For this purpose, the present invention relates to a flow management device or FMV (Flow Management Valve) for the venting circuit of a liquid tank provided with a filling tube, which includes a filling head part, and with a canister, this device comprising:
a) a control chamber that communicates with:
  the canister via a main orifice and a secondary orifice having a smaller flow area than that of the main orifice, these orifices terminating in a ventilation line leading to the canister;
  the interior of the tank via the venting circuit; and
  the filling head via a pressure-equalizing line;
b) a closure member that is:
  provided with an opening that passes right through it and brings the venting circuit into communication with the pressure-equalizing line;
  able to move in the control chamber between an operating position, in which it closes off the main orifice by gravity while leaving the secondary orifice free, and a filling position in which both these orifices are free; and
  shaped such that it sealingly conforms to at least part of the control chamber, said part including the main orifice.

BRIEF DESCRIPTION OF THE DRAWINGS

For a detailed description of the preferred embodiments of the invention, reference will now be made to the accompanying drawings in which:

FIG. 4a shows a horizontal section in the upper part of the same valve as shown in FIG. 3a;

FIG. 5a again shows a horizontal section in the lower part of the same valve as shown in FIG. 3a.

The device according to the invention is intended to form part of a venting circuit as described above, this circuit being used to equip a tank that may contain any liquid. In particular, the liquid may be a fuel, a brake fluid or a lubricant. More particularly, the liquid is a fuel. The tank is intended for any purpose, especially for equipping a vehicle and more especially still for equipping a motor vehicle.

The tank for which the device according to the invention is intended is provided with a filling tube that includes a filling head. The latter is generally closed off in service by a suitable cover (removable plug or automatic closure device, or a "capless" device in the jargon of the field), which is removed/in the open position during filling. In general, this head is at the pressure of the tank when the cover is in place/in the closed position and at atmospheric pressure when the cover is removed/in the open position during filling.

The control chamber of the device according to the invention has a hollow shape capable of accommodating a moving closure member. This closure member is provided with at least one opening that passes right through it and brings the venting circuit into communication with the pressure-equalizing line. The shapes of the control chamber and the closure member are such that the latter sealingly conforms at least to part of the control chamber, this part including the main orifice. Conical complementary shapes (i.e. a conical shape of at least part of the internal surface of the chamber, and a complementary conical shape of at least part of the external surface of the closure member) give good results in terms of sealing. Preferably, these conical surfaces have their apexes facing downwards and have an axis aligned with that of the ventilation duct during filling. Particularly preferably, the generatrices of these surfaces define, with the planes perpendicular to this axis, an angle $\alpha$ not less than 30°, or even 40° and preferably not exceeding 75°, or even 65°.

Figure 1:
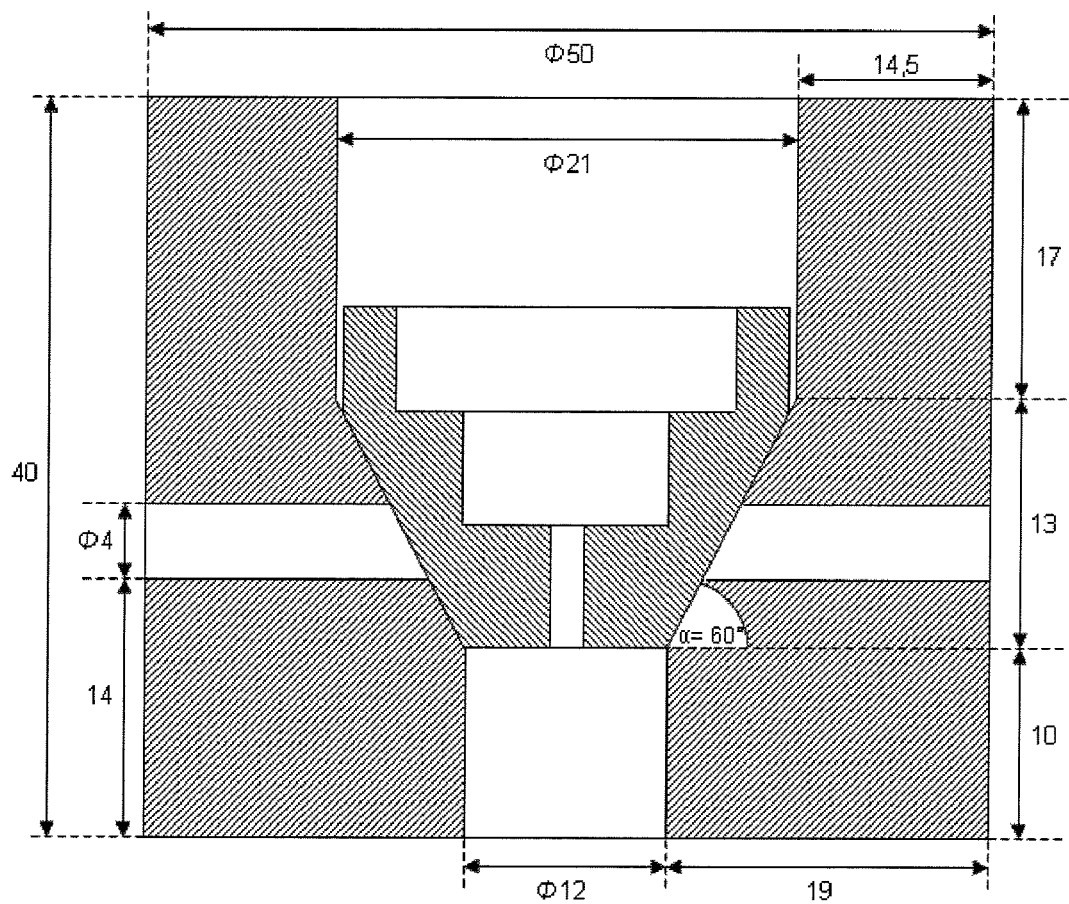
FIG. 1 illustrates a closure member according to a non-limiting embodiment of the present invention, said closure member being a hollow float with a conical external surface and a stepped internal surface.

The closure member according to the invention may be a kind of at least partly conical float. It may be a solid float or alternatively, and preferably, it is a hollow float with a conical external surface and a stepped internal surface. Such a geometry has the advantage of providing, for a given weight (which is dictated by the opening pressure), a greater sealing area. This geometry is illustrated non-limitingly in FIG. 1, in which the dimensions are given simply by way of example.

This closure member is based on any material, preferably a plastic. Polyacetals, particularly POM (polyoxymethylene), are preferred. Its weight is preferably adapted so as to obtain a good compromise between sealing and reaction rate. A weight of the order of a few g gives good results. In general, the closure member has a weight of not less than 2 g, or even 3 g; and generally does not exceed 5 g, or even 4 g.

The closure member is pierced by an orifice, making it possible, when running, to equalize the pressure between the inside of the tank and the duct head. This orifice is of any size and shape. Preferably it has a circular cross section with a diameter between 0.5 and 5 mm, or even between 1 and 3 mm.

The device according to the invention comprises a control chamber provided with a main orifice and a secondary orifice for conveying the gases to the canister, the first providing ventilation during filling and the second ventilation during operation. There may also be several main orifices and/or several secondary orifices. Consequently, the total flow area of the secondary orifices must be smaller than the total flow area of the main orifices. Typically, the "main" flow area is between 50 and 500 mm², or even between 100 and 200 mm², and preferably comprises several orifices. The "secondary" flow area preferably comprises a single orifice (at most two orifices: see below) with a diameter not less than 0.5 mm, or even 1 mm and preferably not exceeding 3 mm, or even 2.5 mm.

The operating principle of the device according to the invention will be explained on the basis of FIG. 2, which illustrates a control chamber consisting of two parts, namely a tubular part (1) communicating with the inside of the tank (via a valve or part of the venting circuit) and a conical part (2) communicating with a pressure-equalizing line (3). This control chamber also communicates with a ventilation line (4) leading to the canister. A closure member (d) can move in the conical part (2) of the chamber between an operating position (not shown) in which it closes off two main orifices (b) that communicate with the canister for ventilation during filling, and an open position in which the closure member frees these orifices. It is pierced by an opening (a) for equalizing the pressure between the tank and the duct head. The operating principle of this device is the following: when the cover of the filling head is in place/in the closed position, the pressure P1 at the duct head is approximately equal to that in the tank. The line (3) therefore applies a pressure P1 to the upper part of the closure member (d) which, at rest (when the duct head is closed off), is therefore in the low position and obstructs the orifices (b). At this moment, the tank can be vented only via a secondary orifice (c) (typically with a maximum diameter of 3 mm). When the cover is removed/opened, in order to carry out a filling operation, the pressure P1 suddenly becomes equal to atmospheric pressure. Now, filling causes a certain flow of gas that cannot escape from the tank except via the small orifice (c). This results in a large pressure drop, which causes the pressure in the tank to rise and finally applies a force on the closure member (d) sufficient to raise it and expose the orifices (b) of a larger cross section. The tank can then be filled with a relatively low pressure. As soon as filling has been completed, the cover is flipped back/closed and the pressure progressively equalizes between the inside of the tank (via the tubular part of the chamber (1)) and the filling head (via the pressure equalizing line (3)). The closure member (d) therefore returns to its rest position by gravity and, by so doing, again closes off the large ventilation orifices (b) so that the tank is now left to "breathe" only via the small orifice (c).

The term "breathe" is understood to mean gases can flow into the tank and out of the tank. The term "gases" is understood in particular to mean the external air that have to be introduced into the tank or the gas mixtures that are in the tank and have to be able to be removed. In the case of a fuel tank, these gas mixtures essentially comprise air and fuel vapour.

The device according to the invention may be inserted as such into a venting circuit of a liquid tank, at an appropriate point allowing the various required connections. However, this device is preferably intended to be incorporated into a valve forming part of the venting system.

Consequently, the present invention also relates to a valve incorporating a device as described above and comprising:
  a) a chamber that includes a gas inlet orifice opening into the tank and a main gas outlet orifice that communicates with the control chamber of the device; and
  b) a float that can slide vertically inside the chamber so as to close off the main gas outlet orifice in the high position.

The term "incorporated" is understood to mean directly fastened in or on the valve, or produce as a single component with at least part of the latter (for example, its cover). The latter embodiment is preferred.

The chamber of the valve according to this embodiment of the invention generally comprises a side wall, preferably a substantially cylindrical side wall, a bottom of any shape (flat, rounded, conical, etc.) and a cover. It includes at least one inlet orifice that brings its internal volume into communication with the inside of the tank. It may include several such orifices, the size, shape and location of which are adapted according to the specifications of the valve. In general, the inlet orifice is located on the side wall of the chamber, in its upper part. Positioning gas-flow openings in the upper part of the chamber very considerably reduces any impact on these openings of the level of liquid and its movements, thus allowing venting in certain critical situations. This impact may also, where appropriate, be reduced by the use of at least one baffle placed facing some and preferably all of the openings. It may be a single baffle having a substantially annular cross section, surrounding the head of the valve. Alternatively, a succession of baffles may be used, each facing one or more openings. This baffle or baffles may be located inside and/or outside the chamber. The embodiment with an internal baffle is advantageous.

The chamber of the valve according to this embodiment of the invention may have any shape, often internally matched to the sliding of the float. Usually, the chamber has for this purpose a constant, internal cross section, at least in the part where the float must be able to slide. In particular, at least in this part, it is internally cylindrical.

The float of the valve according to this embodiment of the invention may have any geometry. The external (lateral) shape of the float is obviously matched to that of the inside of the chamber in which it must be able to slide. It therefore generally has a cylindrical external shape.

The float has a head of appropriate shape so as to be able to close off the main outlet orifice of the chamber, that is to say to cooperate with a complementarily shaped valve seat (present on or incorporated into the outlet orifice). The float head may have a cone shape, intended to cooperate with a frustoconical seat. Alternatively, the head of the float may be flat, intended to cooperate with a circular seat.

Preferably, the valve includes a seal for sealing the valve in the closed position (that is to say when the float closes off the main outlet orifice of the valve). This seal may be integral either with the float or with the main outlet orifice. It is preferably integral with the head of the float. It may have any shape. If the seal is carried by the float (in its head), a substantially flat seal (such as a portion of a membrane with a lip or excrescence on the rim) gives good results and is simple to produce in practice. This seal may have a contour of any shape. A contour of substantially circular shape is particularly simple and gives good results. This seal may be made of any material, but is preferably sufficiently flexible to ensure sealing. Elastomers are very suitable as constituent material for the seal.

The FMV device may be fastened, as such, to the valve or in communication with its gas outlet orifice. However, the control chamber of this device preferably has one wall at least partly common with or included in a connection to the ventilation line leading to the canister, this wall part being provided with main and secondary orifices towards the canister. According to this embodiment, the control chamber/ventilation line connection assembly consists of a single component that may be fastened to or that is made as a single component with the cover of the valve. The latter embodiment is preferred so as to reduce the number of components to be assembled.

Preferably, the bottom of the valve chamber is provided with small purge openings, the size of which is sufficient to discharge the liquid when the liquid level lies below said bottom, but too small for the liquid to penetrate into the chamber via said purge openings.

The valve according to the invention allows a liquid tank to be vented at a variable rate (higher during filling than in operation). As such, it does not have the function of fixing the maximum filling level (FLVV (Fill Limit Venting Valve) function), so as to prevent the ingress of liquid in the event of the vehicle rolling over or being on an excessively steep slope (ROV (Roll Over Valve) function), to ventilate in the full-up case and/or to prevent over-filling (OFP (Over-Filling Prevention) function). These functions must therefore, where appropriate, be fulfilled by independent devices or by additional means that would be combined with the valve.

The abovementioned FLVV function may be provided by any known means, for example by adapting the geometry of the chamber and its openings, and by providing the float with a preloaded spring so that said float closes off the main output orifice of the chamber when the maximum filling level is reached. In this embodiment, at least one of the inlet orifices of the chamber is preferably located at a height such that its lower edge corresponds to the fuel level in the tank when the filling nozzle first triggers off. In this case, during filling, liquid will penetrate into the float via the lateral opening, until said float closes off the outlet orifice. Furthermore, in operation, when the level of liquid in the tank drops below the bottom of the chamber, the liquid is discharged therefrom via the purge openings.

Again in this embodiment, the secondary orifice of the control chamber (via which ventilation in operation takes place) may be moved to the chamber of the valve (in particular to its cover). Thus, for example by ensuring that this second orifice also cooperates with a float that can close it off in the high position, it is sufficient for the floats to be suitably preloaded (for example, by means of springs) so that the high position of the main float corresponds to the first time a filling nozzle triggers off and the high position of the secondary float corresponds to a second time said nozzle triggers off. In this way, a "round up" function is provided.

As an alternative to moving the secondary orifice to the chamber, an additional orifice may be provided (in addition to that of the control chamber) on said chamber, making it possible to connect the inside of the valve (and therefore the tank) to the canister.

Likewise, to provide the ventilation function at the end of filling-up, the secondary orifice of the control chamber may be moved or an additional orifice may be provided and equipped with a heavy ball or a preloaded disc that closes it off by gravity when the pressure in the tank is below a given threshold pressure. In particular, a preloaded disc larger in size than the secondary outlet orifice and provided with perforations (generally at least 3, or even 4 perforations) uniformly distributed around its periphery that are not used for closing off said orifice gives good results. The term "preloaded" or "heavy" is understood in fact to mean that the weight is matched according to the desired threshold pressure, which in general depends on the vehicle manufacturer's specification. In the case of an OFP disc, this is advantageously provided with perforations in its peripheral part for the purpose of facilitating the opening/closing dynamics of the secondary orifice. This disc is preferably limited/guided in its movement by at least one guide, optionally assisted by a series of lugs (3 or 4) that prevent the disc from being pressed against the wall of the cover.

As regards the ROV function mentioned below, the means generally employed for providing it also consist of a heavy ball and/or a preloaded spring cooperating with a float (which may be the aforementioned float or floats). In the event of the tank rolling over, the ball or the spring pushes the float into the closed position of the valve and keeps it in this position by gravity.

In the embodiments using two valves, their axes of translation are either coincident (concentric floats) or parallel (floats connected in parallel). The 1st embodiment has, as advantage, greater compactness (better use of the cylindrical shaft (less space wasted)) and, as disadvantage, possible interaction between the two floats (the central float not having its own shaft). The 2nd embodiment avoids this drawback, but loses the advantage of compactness.

It should be noted that when a second float is present, this (and/or the orifice with which it cooperates) preferably includes a seal for providing good sealing in the closed position. Given the small size of the secondary orifice, a needle-shaped seal is very suitable.

The constituent elements of the valve may be made of any material. Preferably, they are based on a thermoplastic. In this case, it is obviously convenient to choose the material or materials in such a way that they withstand the operating stresses. In particular, the materials chosen must be inert with respect to the liquids with which they have to be in contact, in particular inert with respect to fuels.

In particular in the case in which the liquid tank is a fuel tank made of plastic, most of the constituent elements of the valve according to the invention are also made of plastic. The term "plastic" is understood to mean any polymeric synthetic material, whether thermoplastic or thermosetting, which is in the solid state under ambient conditions, as well as blends of at least two of these materials. The intended polymers comprise both homopolymers and copolymers (especial binary or ternary copolymers). Examples of such copolymers are, non-limitingly: random copolymers, linear block copolymers, non-linear block copolymers, and graft copolymers. Thermoplastic polymers, including thermoplastic elastomers, and blends thereof are preferred.

Any type of thermoplastic polymer or copolymer, the melting point of which is below the decomposition temperature, is suitable. Thermoplastics having a melting range spread over at least 10 degrees Celsius are particularly suitable. Examples of such materials include those that exhibit polydispersion in their molecular weight.

In particular, the valve according to the invention may be made of polyolefins, grafted polyolefins, thermoplastic polyesters, polyketones, polyamides and copolymers thereof.

One polymer often used in plastic fuel tanks is polyethylene, in particular high-density polyethylene (HDPE) possibly in a multilayer structure including a barrier layer (for example based on EVOH, or hydrolyzed ethylene/vinyl acetate copolymer) or one with a surface treatment (fluorination or sulfonation for example) for the purpose of making it impermeable to the fuels for which it is intended. Consequently, when the valve according to the invention includes a cover, this is preferably based on HDPE, so as also to be welded to the tank. As for the other parts of the valve, these are preferably based on at least one hydrocarbon-impermeable plastic. Examples of such hydrocarbon-impermeable plastics are, non-limitingly: polyethylene terephthalate or polybutylene terephthalate, polyamides, polyketones and polyacetals. It should be noted that all these parts, the cover included, may be multilayer structures, comprising, for example, at least one high-density polyethylene layer and optionally a hydrocarbon barrier layer (on the surface or within said structures).

In the case of a plastic fuel tank, and in particular one based on HDPE, good results have been obtained with valves, including a cover, based on HDPE, a chamber and a float made of POM (polyoxymethylene) or PBT (polybutylene terephthalate), and a seal made of a fluoroelastomer.

The method and the position for fastening the valve to the tank may be chosen in any standard manner suitable for the specific conditions. Preferably, the valve is joined directly to the upper wall of the tank and preferably by welding its cover (see above).

Figure 3A:
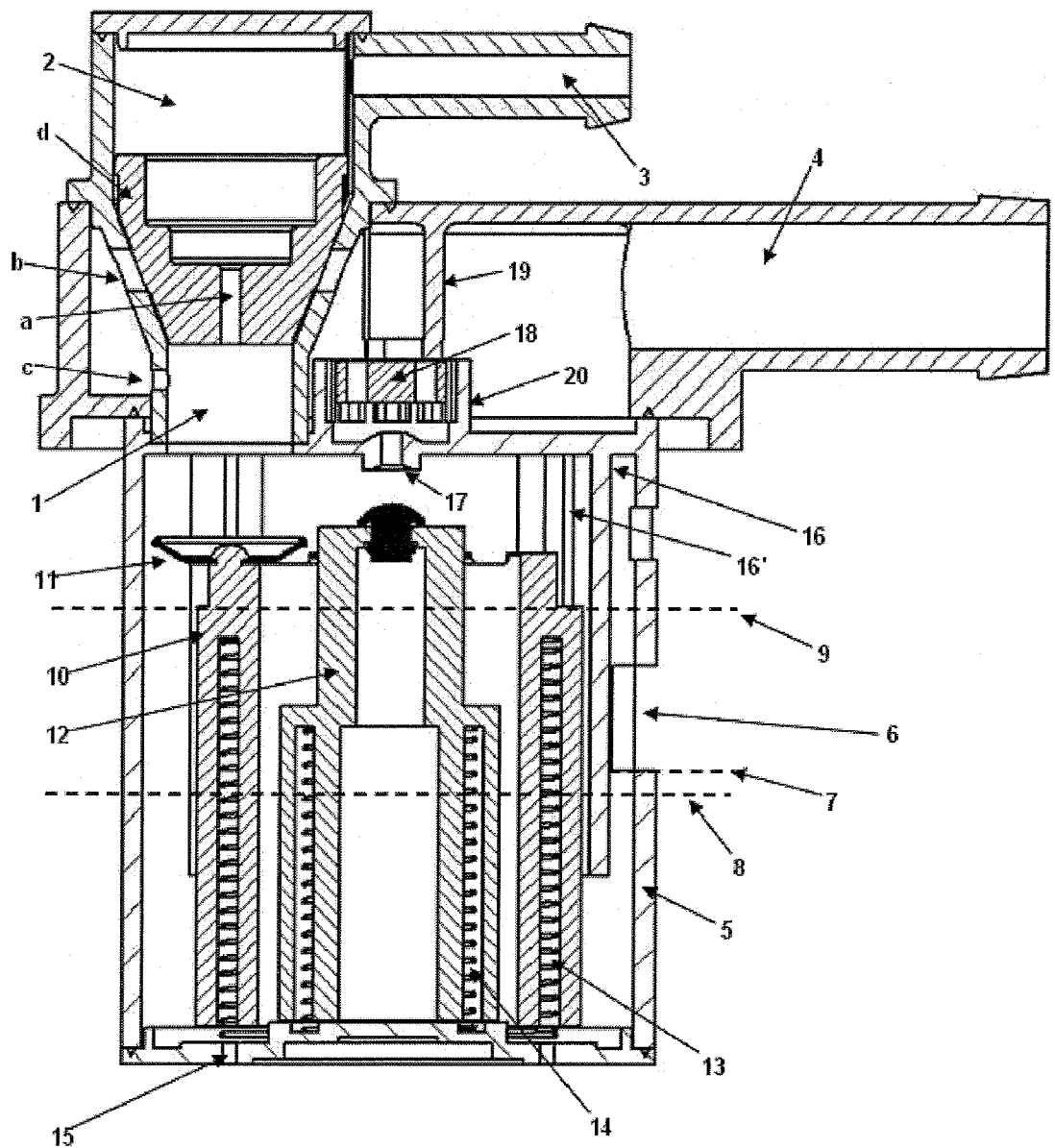
FIG. 3a shows a vertical cross-section through a valve incorporating a FMV device according to an embodiment of the present invention with concentric floats.
Figure 3B:
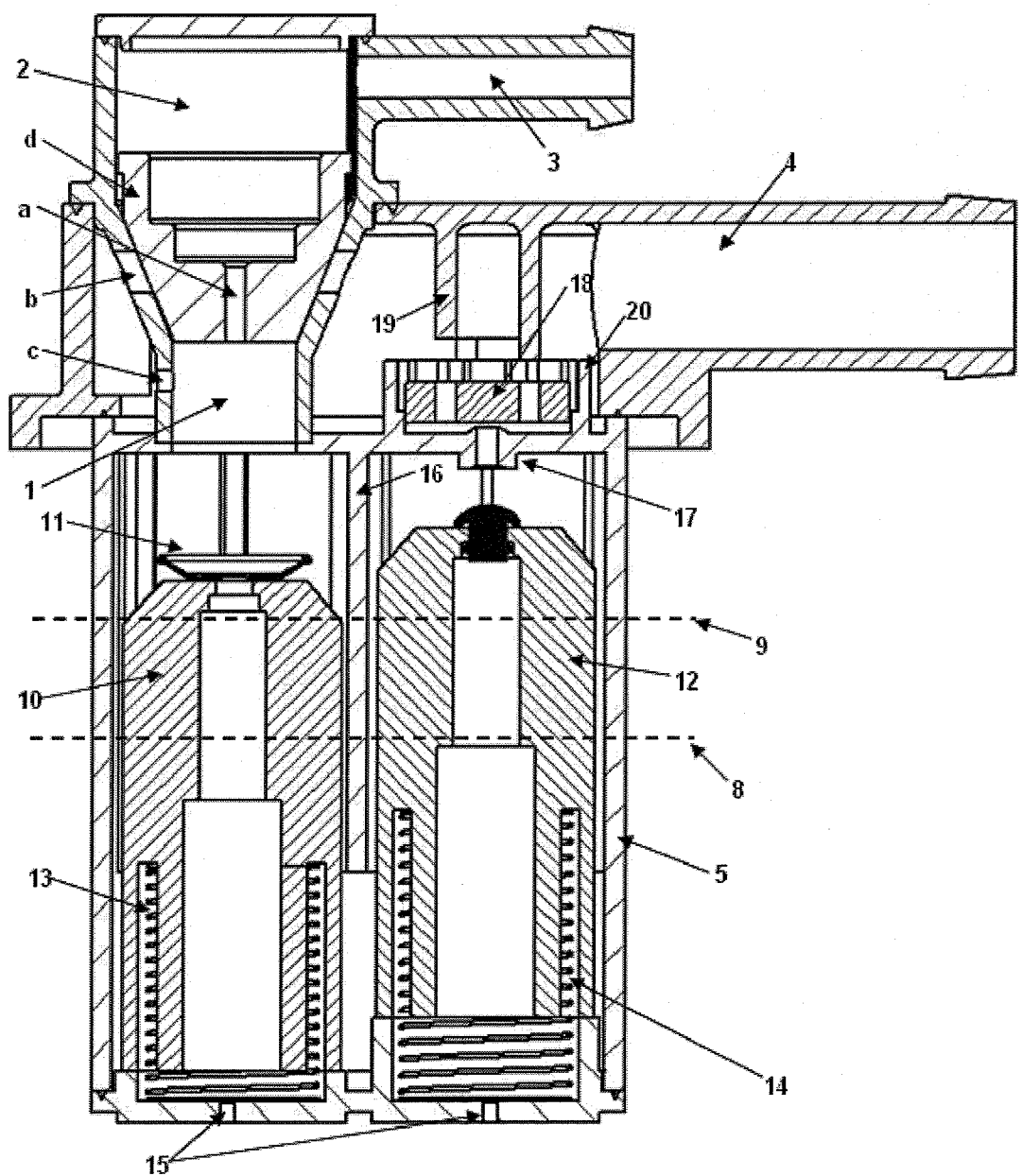
FIG. 3b shows a vertical cross-section through a valve incorporating a FMV device according to an embodiment of the present invention with parallel floats.
Figure 4A:
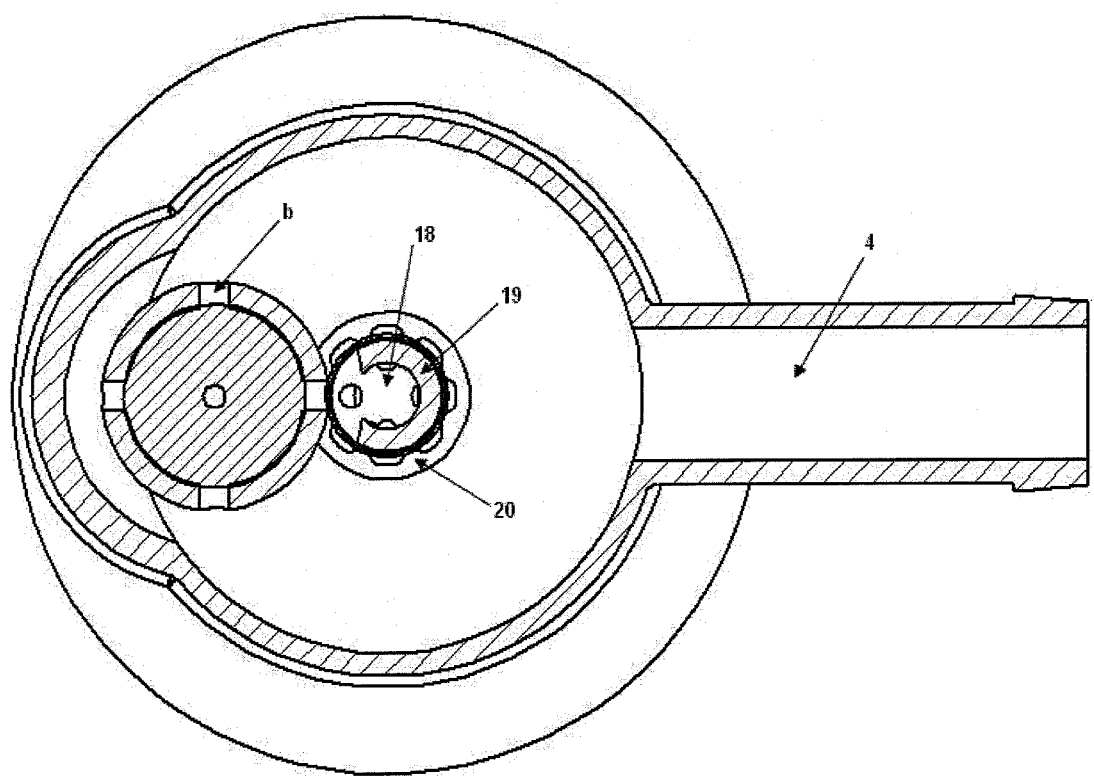
Figure 4B:
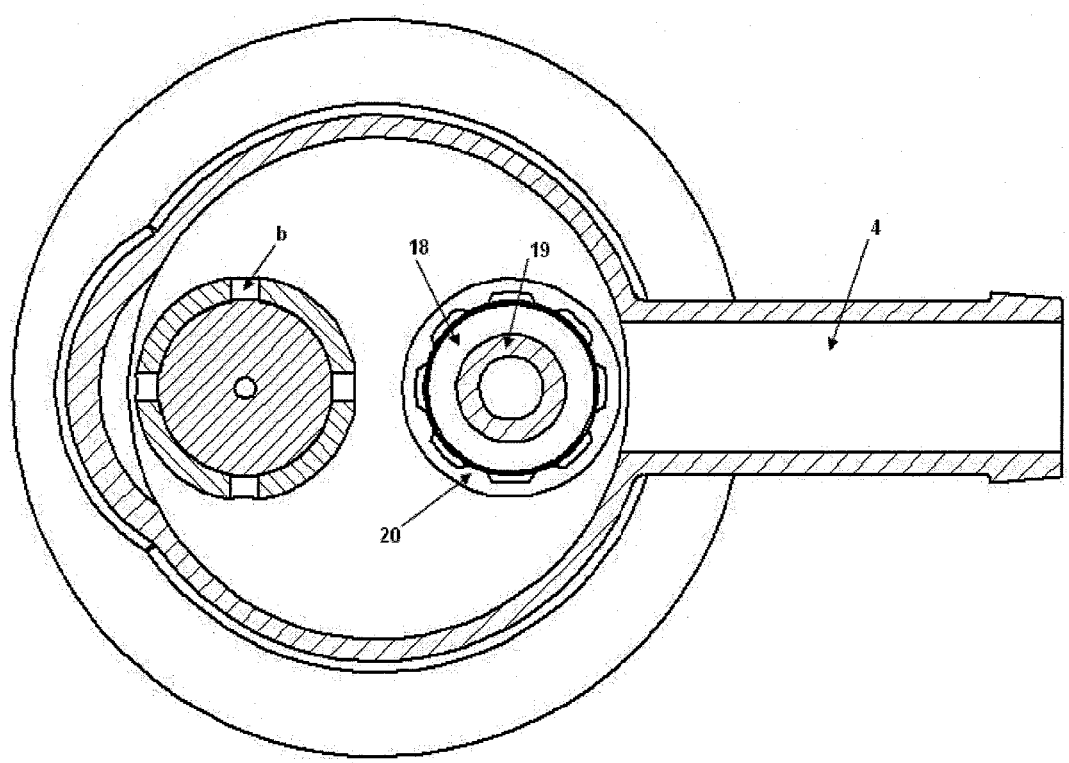
FIG. 4b shows a horizontal section in the upper part of the same valve shown in FIG. 3b.
Figure 5A:
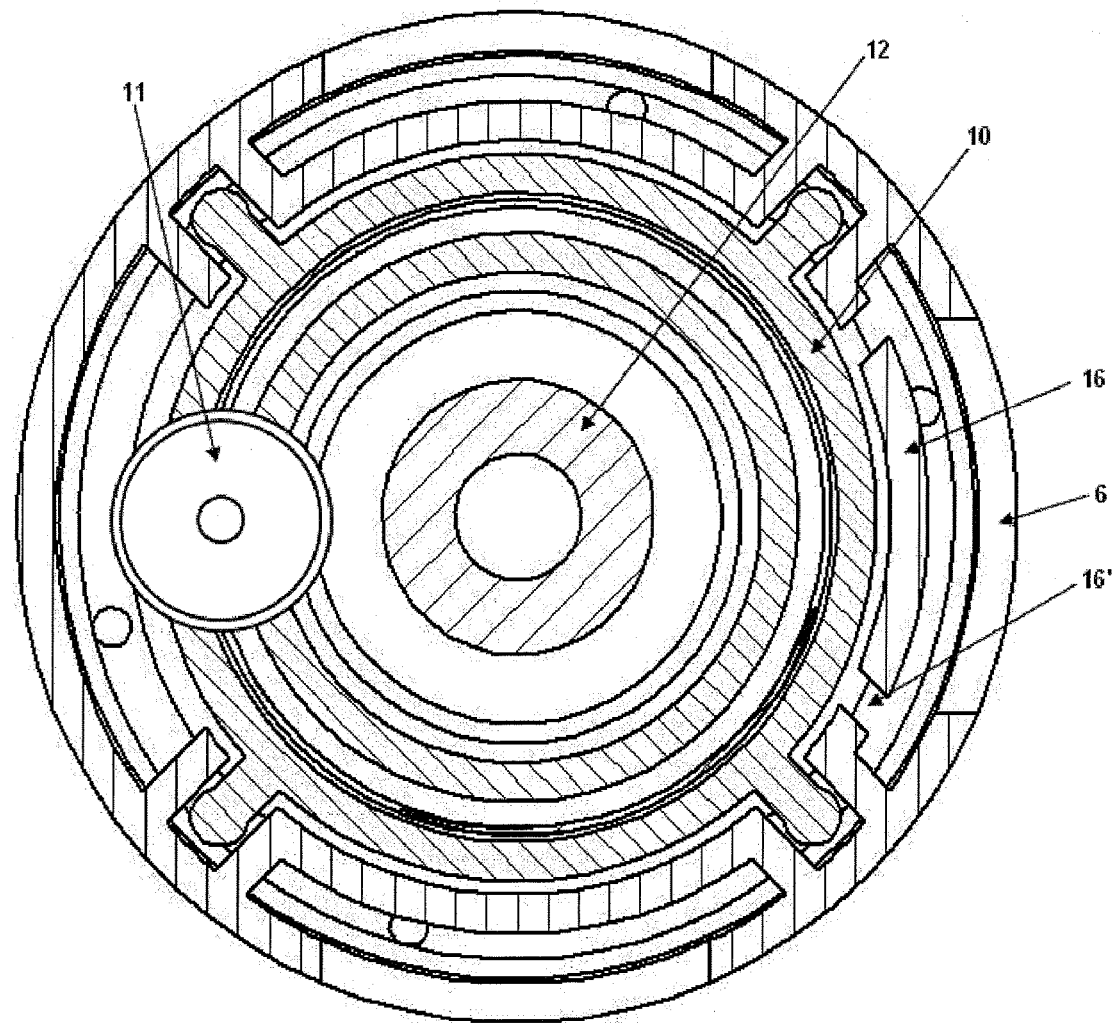
Figure 5B:
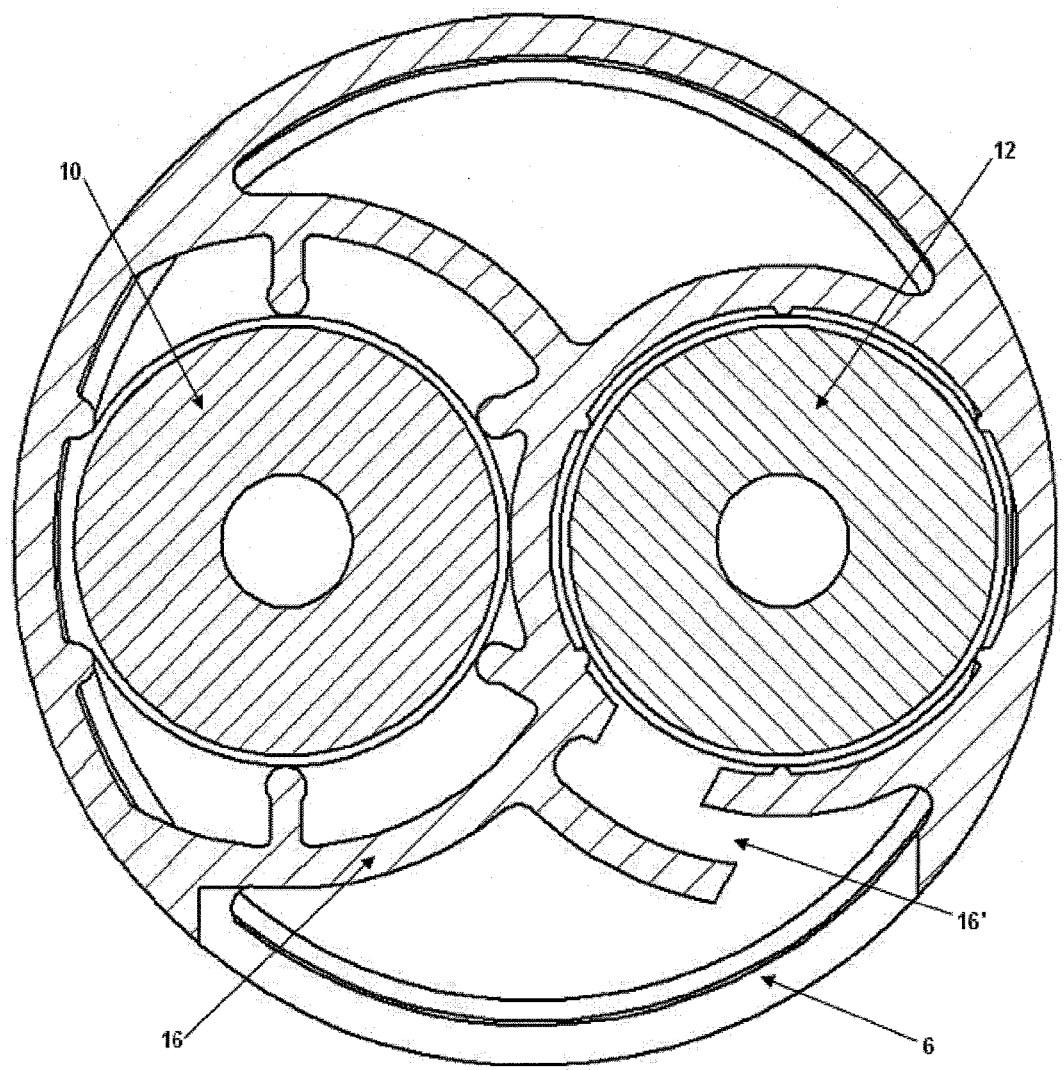
FIG. 5b again shows a horizontal section in the lower part of the same valve as shown in FIG. 3b.

A valve incorporating an FMV device according to the invention is illustrated non-limitingly by FIGS. 3 to 5.

FIG. 3 shows a vertical cross section through a valve incorporating several preferred embodiments of the present invention;

FIG. 4 shows the same valve, in horizontal section in its upper part; and

FIG. 5 again shows the same valve, but in horizontal section in its lower part.

The "a" figures relate to the embodiment with concentric floats and the "b" figures relate to the embodiment with parallel floats.

Figure 2:
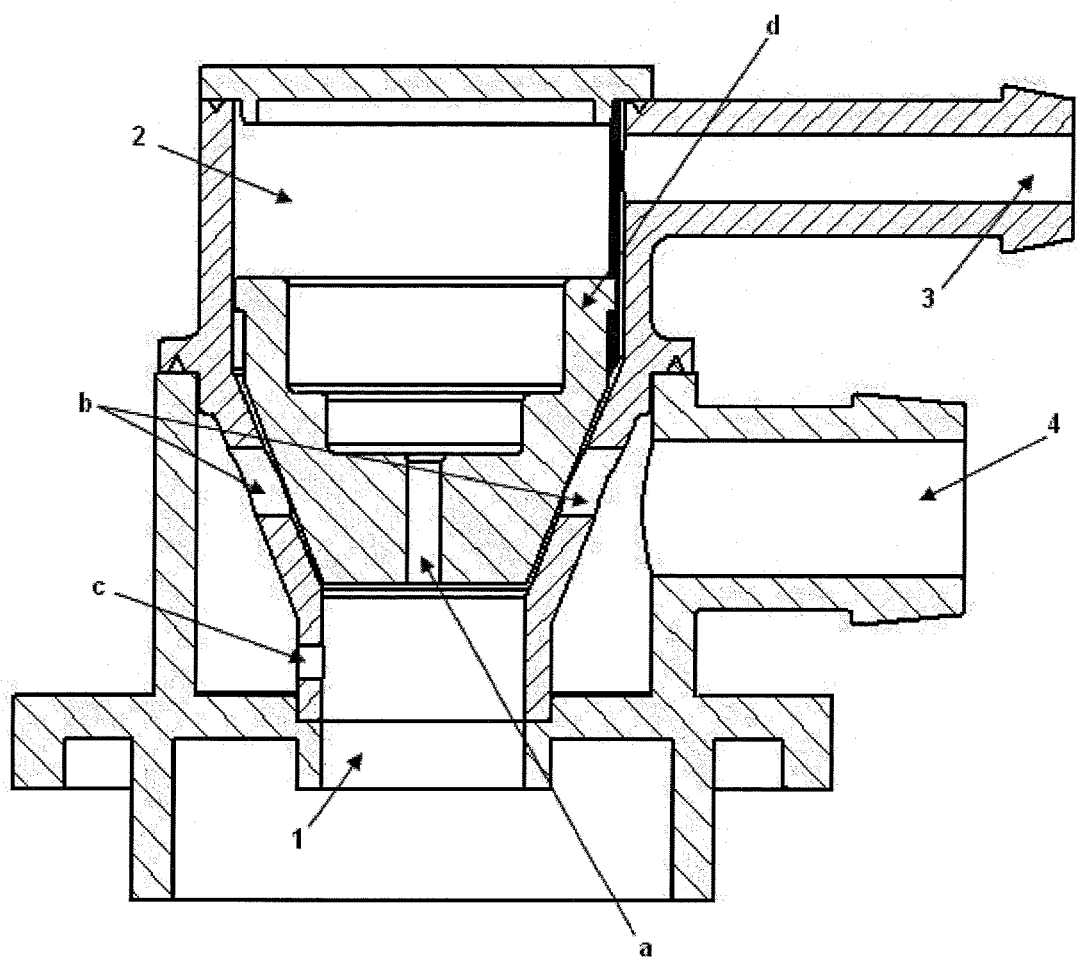
FIG. 2 illustrates a control chamber comprised in the device according to an embodiment of the present invention.

These figures show a venting valve that includes an FMV device as shown in FIG. 2, with the same numbers and letters so as to designate identical elements. This device is incorporated into a valve comprising an chamber (5) that opens into the tank (not shown) via at least one inlet orifice (6) that is located in the upper part of the side wall of the chamber (it is therefore a lateral opening). The lower end (7) of this orifice (6) corresponds to the level of liquid in the tank when the filling nozzle first triggers off. In reality, the valve illustrated comprises three lateral openings (6) in the "a" embodiment (which are visible in FIG. 5a) and a single lateral opening in the case of the "b" embodiment (see FIG. 5b), and also an internal baffle (16) located facing these openings and itself pierced by openings (16') allowing the liquid to penetrate into the lower part of the chamber.

A float (10), shown in the low position, and provided with a seal (11), can slide vertically in the chamber (5). The float (10) and seal (11) are capable of sealing off the lower part (1) of the control chamber when the float (10) is in its high position, that is to say when the float has reached its high-position float line and/or when the tank is upside down. The lower level, indicated by the dotted line (8), corresponds to the float line of the main float (10) in the low position. The fuel level when the float is in the high position (and closes off its seat) is equal to the level (8) plus the travel of the float (which is about 10 mm).

The valve illustrated also includes a secondary float (12), concentric with or inside the main float (10), and capable, in the high position, of closing off an outlet orifice (17) of the chamber, leading directly into a chamber for connection to the ventilation line (4) towards the canister (not shown). The upper level indicated by the dotted line (9) corresponds to the float line of the secondary float (12) in the low position.

In the embodiment shown, owing to the presence of the OFP disc (18), the level (7) of liquid in the tank when the orifice (1) has been closed off cannot be exceeded since, as soon as it is reached, all the outlets of the chamber (the orifice 17 and the end of the tubular part (1)) are closed off. The pressure therefore rises in the tank and immediately triggers off the nozzle, without any possibility of a "round up". The OFP disc (8) is provided with perforations in its peripheral part for the purpose of facilitating the opening or the closing dynamics of the orifice (17). This disc is guided in its movement by a lower cage (20) and upper lugs (19) which act as a stop.

The floats (10)(12) are preloaded by means of springs (13)(14), which also provide an ROV function in the event of the tank rolling over, in the event of the vehicle being parked on a slope, or in the event of waves, etc. It is necessary to ensure that the floats (10)(12) are pushed on to their respective seats (1)(17) upon these events.

Finally, the chamber (5) has a bottom provided with small purge openings (15) via which the liquid that has penetrated into the chamber (5) is discharged when the level of liquid in the tank drops below the level where this bottom lies.

This valve operates as follows: in normal operation (as illustrated), that is to say when the level in the tank is below the level bounded by the bottom of the valve and the filling tube head is closed off, venting takes place only via the orifice (c) that brings the inside of the tank into communication with the canister via the ventilation line (4) and the orifices (6). During filling, the pressure in the tank rises and pushes the closure member (d) up, thereby freeing the orifices (b) so as to allow ventilation to the canister at a higher rate. At the same time, the level of liquid in the tank rises so as to reach the lateral openings (6) and penetrate the chamber (5). The main float (10) will then rise and the seal (11) ends up by closing off the lower part of the tube (1) and causing the filling nozzle to trigger off.

Thereafter, over-filling is impossible since the disc (18) closes off the orifice (17), hence causing a pressure rise that automatically triggers off the filling nozzle. The preloading of this disc (18) is such that in operation, it allows any overpressure in the tank to be relieved (by rising when a certain pressure is exceeded, which depends on its preloading).

If the orifice (17) were not to be provided with such a disc (18), over-filling would be possible and the fuel level could rise until the secondary float (12) closes off the orifice (17) (after a travel of about 5 mm) and thereby causing final triggering off of the nozzle.

If the valve were not to be provided with an orifice (c) as shown, in operation the ventilation would be provided by the orifice (17). Such a valve would operate as follows:

FLVV version with "round up" function (no disc (18)): at the start of filling the air can escape only via the orifice (17); the pressure therefore rapidly increases and the closure member (d) rises. In operation, the closure member (d) closes off the orifices (b) and only the orifice (17) allows ventilation;

FLVV version with ventilation in the full-up case (with a disc (18)): as soon as filling starts, all the orifices (the orifices (b) and the orifice (17)) are closed off and the pressure increases; the closure member (d) therefore rises. When the vehicle is being driven, the closure member (d) obstructs the orifices (b); ventilation therefore takes place only via the orifice (17), and only sporadically, when the disc preloading pressure is reached.

It follows from the foregoing that the valve according to this embodiment of the invention can be used equally well with a disc (18) as without it, and with or without an orifice (c), depending on the manufacturers' specifications. Such a valve is therefore versatile.

The invention claimed is:

1. A flow management device for a venting circuit of a liquid tank provided with a filling tube, which includes a filling head part, and with a canister, this device comprising:

a) a control chamber (1, 2) that communicates with:
the canister via a main orifice (b) and a secondary orifice (c; 17) having a smaller flow area than that of the main orifice, these orifices terminating in a ventilation line (4) leading to the canister;
the interior of the tank via the venting circuit; and
the filling head via a pressure-equalizing line (3);
b) a closure member (d) that is:
provided with an opening (a) that passes right through it and brings the venting circuit into communication with the pressure-equalizing line (3);
able to move in the control chamber (1, 2) between an operating position, in which it closes off the main orifice (b) by gravity while leaving the secondary orifice (c; 17) free, and a filling position in which both these orifices are free; and
shaped such that it sealingly conforms to at least part of the control chamber (2), said part including the main orifice (b).

2. The device according to claim 1, in which the closure member (d) has a generally conical external shape.

3. A valve incorporating a device according to claim 1, said valve comprising:
a) a chamber (5) that includes a gas inlet orifice (6) opening into the tank and a main gas outlet orifice that communicates with the control chamber (1, 2) of the device; and
b) a float (10) that is capable of sliding vertically inside the chamber (5) so as to close off the main gas outlet orifice when in its high position.

4. The valve according to claim 3, in which the control chamber (1, 2) has one wall at least partly common with or included in a connection to the ventilation line (4) leading to the canister and in which this wall part is provided with main (b) and secondary (c) orifices towards the canister.

5. The valve according to claim 4, in which the chamber (5) comprises a side wall, a bottom and a cover that incorporates the control chamber (1, 2), the pressure-equalizing line (3) and the connection to the ventilation line (4) leading to the canister.

6. The valve according to claim 3, in which the chamber (5) includes a secondary gas outlet orifice (17) that communicates with the ventilation line (4) leading to the canister.

7. The valve according to claim 6, in which a secondary float (12) is capable of closing off the secondary orifice (17) when in its high position, the high position of the main float (10) corresponding to a first triggering off of a filling nozzle, and the high position of the secondary float (12) corresponding to a second triggering off of said filling nozzle.

8. The valve according to claim 6, in which the secondary outlet orifice (17) is provided with an OFP device (18) consisting of a heavy ball or a preloaded disc closing off the secondary outlet orifice (17) by gravity when the pressure in the tank is below a given threshold pressure.

9. The valve according to claim 8, in which the OFP device (18) is a preloaded disc having a greater size than the secondary outlet orifice (17) and provided with at least three perforations uniformly distributed on its periphery that do not serve for closing off said orifice (17).

10. The valve according to claim 6, wherein at least one float is provided with a device (13, 14) for fulfilling a ROV function.

* * * * *